US005734383A

United States Patent [19]

Akimichi

[11] Patent Number: 5,734,383
[45] Date of Patent: Mar. 31, 1998

[54] APPARATUS AND METHOD FOR GENERATING A THREE-DIMENSIONAL MODEL ON A GRAPHIC DISPLAY FROM A TWO-DIMENSIONAL IMAGE

[75] Inventor: Shinji Akimichi, Osaka, Japan

[73] Assignee: Takenaka Corporation, Osaka, Japan

[21] Appl. No.: 584,082

[22] Filed: Jan. 11, 1996

[30] Foreign Application Priority Data

Jan. 17, 1995 [JP] Japan ............................ 7-004620

[51] Int. Cl.$^6$ .................................................. G06F 15/00
[52] U.S. Cl. ........................................................ 345/420
[58] Field of Search .................................. 395/119, 120, 395/123, 124, 125; 382/189, 309, 315; 345/133, 179

[56] References Cited

U.S. PATENT DOCUMENTS

| | | | |
|---|---|---|---|
| 5,012,521 | 4/1991 | Endo et al. ................ | 382/189 |
| 5,363,476 | 11/1994 | Kurashige et al. ......... | 395/120 X |
| 5,379,371 | 1/1995 | Usami et al. .............. | 395/120 X |
| 5,561,748 | 10/1996 | Niu et al. ................... | 395/120 |

FOREIGN PATENT DOCUMENTS

| | | |
|---|---|---|
| A-60-75980 | 4/1985 | Japan. |
| A-1-237882 | 9/1989 | Japan. |
| A-7-168951 | 7/1995 | Japan. |

OTHER PUBLICATIONS

Yu Z. Z. et al., "Elecpapen: An Integrated and Intelligent User Interface System for CAD," Proceedings of HCI International '93, Orlando, Florida, 1993.

Negroparte, N., et al., "Munch: An experiment in Sketch Recognition," Proceedings of the Edru 3/Ar 9 conference, Los Angeles, California, 1972.

*Primary Examiner*—Phu K. Nguyen
*Assistant Examiner*—Cliff N. Vo
*Attorney, Agent, or Firm*—Oliff & Berridge, PLC

[57] ABSTRACT

According to the present invention, a solid model could be automatically generated with a feeling of sketch.

When point sequence data inputted from a tablet are inputted in order to sketch a solid model, graphic recognition processing is performed. Next, a recognized graphic is subjected to automatic editing processing, and then a model generation plane for the graphic is generated. Next, a projection line for connecting a view point to a point on the tablet is generated in a coordinate system in a three-dimensional space. An intersection point between the generated model generation plane and the projection line is determined to derive edges, etc. Next, solid model data are derived by using the derived edges, etc., and the data are stored. The stored data (three-dimensional) are converted into two-dimensional coordinates, and they are displayed on the tablet.

6 Claims, 20 Drawing Sheets

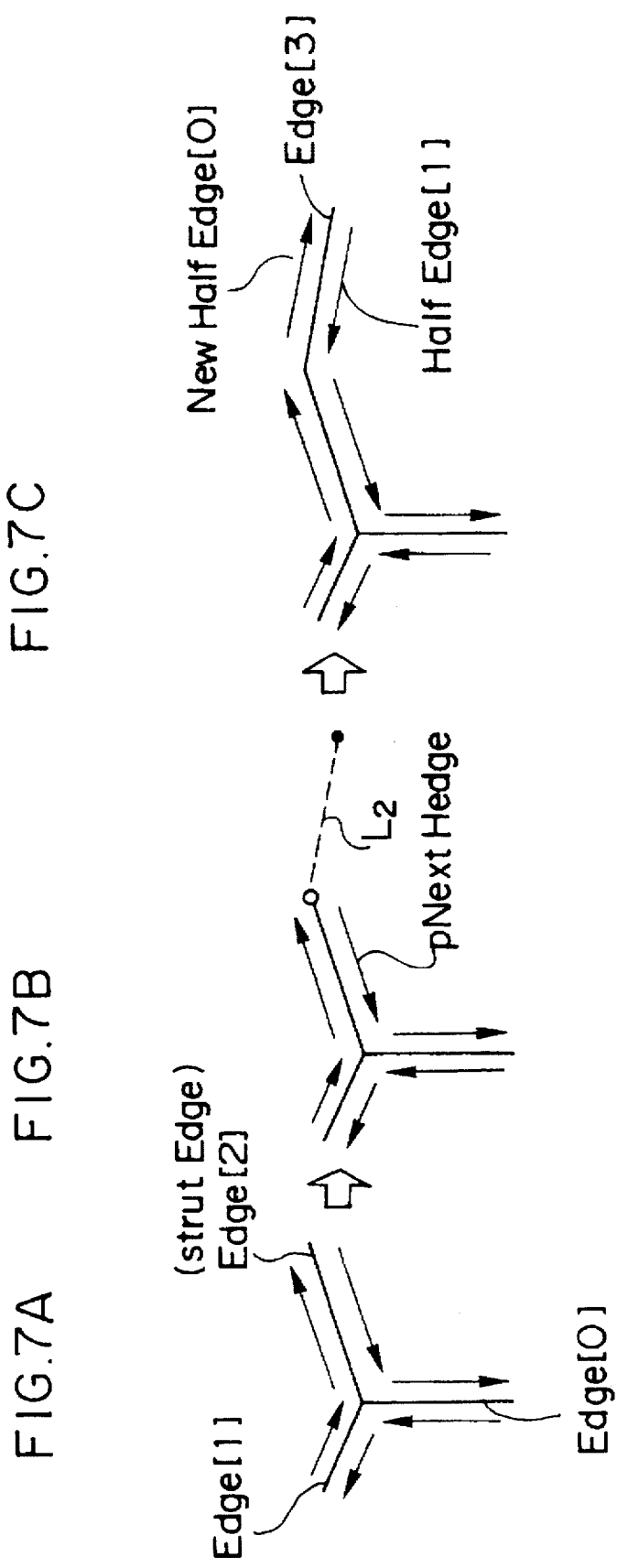

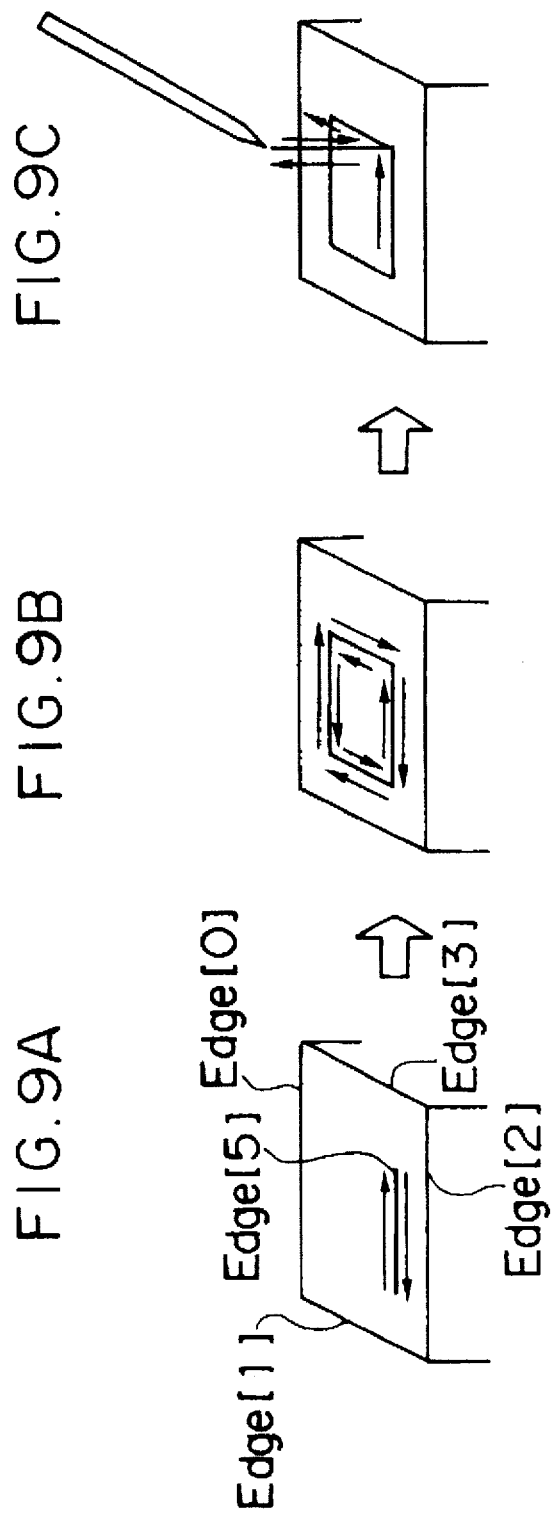

All gone

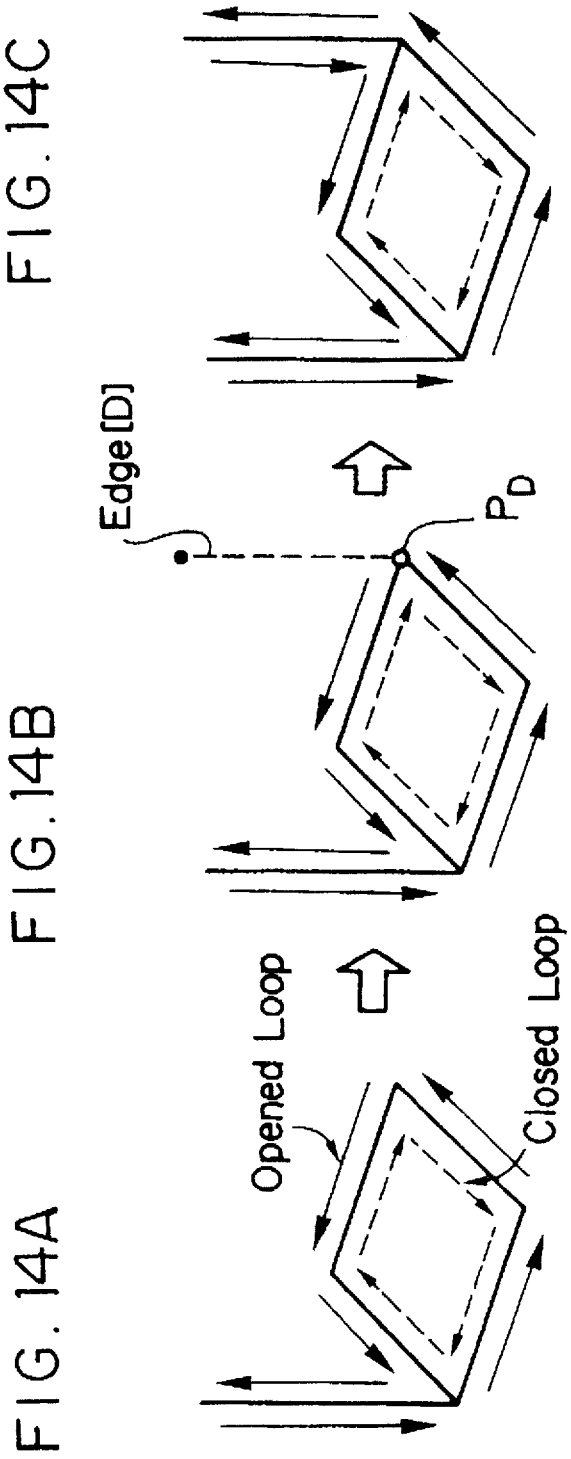

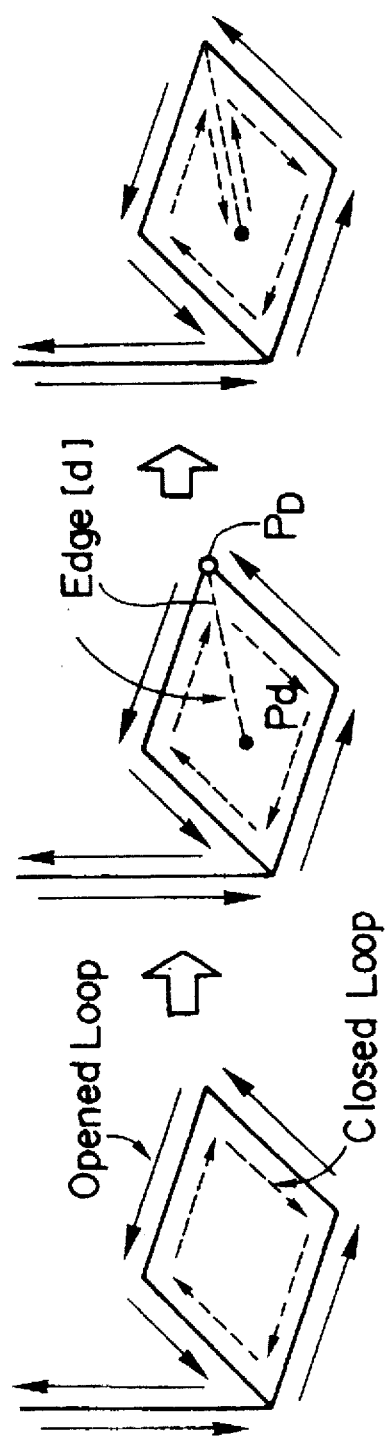

NEW LINE SEGMENT

⇧

EXAMPLE OF RULE (3)

BOTH A AND B BELONG TO COUNTERCLOCKWISE LOOPS

SELECT B

NEW LINE SEGMENT

⇧

EXAMPLE OF RULE (4)

BOTH A AND B BELONG TO CLOCKWISE LOOPS

SELECT A

NEW LINE SEGMENT

⇧

EXAMPLE OF RULE (5)

A BELONGS TO CLOCKWISE LOOP AND
B BELONGS TO COUNTERCLOCKWISE LOOP

SELECT B

APPARATUS AND METHOD FOR GENERATING A THREE-DIMENSIONAL MODEL ON A GRAPHIC DISPLAY FROM A TWO-DIMENSIONAL IMAGE

BACKGROUND OF THE INVENTION

The present invention relates to a graphic input and output apparatus. In particular, the present invention relates to a graphic input and output apparatus in which a handwritten sketch is inputted into a computer to make and display a solid model for representing a three-dimensional configuration or the like.

A three-dimensional CAD system for making a solid model to represent a three-dimensional configuration of an object has been hitherto known. When the solid model is made by using the three-dimensional CAD system, in general, three-dimensional coordinate values of each of vertexes of the solid model are sequentially inputted along a configuration of the model. In this system, it is necessary for a designer to assume an arrangement of an imaged model configuration in a three-dimensional coordinate system capable of being handled in the three-dimensional CAD system, and previously calculate coordinate values of each of vertexes of the model configuration as absolute values or relative values in the three-dimensional coordinate system. The calculated coordinate values are used to input numerical coordinate values of each of the vertexes of the model configuration by using special commands corresponding to each type of model configurations. In general, the input process and results are confirmed by using a projective view such as an isometric view.

In the conventional three-dimensional CAD system, coordinate values have been determined while assuming an arrangement of an model configuration imaged by a designer in a three-dimensional coordinate system. Because of this fact, the designer is required to undergo an excessive load. Further, in order to input calculated coordinate values, a command corresponding to the model configuration must be sequentially selected. Accordingly, extensive time and labor have been required for an input operation, resulting in an inefficient work.

SUMMARY OF THE INVENTION

It is an object of the present invention to provide a graphic input and output apparatus with which a solid model can be easily made by a designer by drawing an isometric view or a perspective view on a screen with a feeling of sketch.

The input means of the present invention is constituted by an electronic pen and a tablet. The tablet corresponds to a projection plane for an object in a predetermined coordinate system in a three-dimensional space for inputting a configuration of the object to be made. The input means converts a locus of the electronic pen on the tablet into point sequence data and inputs them. Therefore, data on a handwritten graphic obtained by drawing an illustration on the tablet with the electronic pen are converted into point sequence data to be inputted. The judging means judges a certain graphic in two-dimensional geometry represented by the locus of the electronic pen on the tablet on the basis of the inputted point sequence data. The plane-generating means generates a plane for model generation in the coordinate system in the three-dimensional space in accordance with predetermined conditions by using any specified point selected from vertexes and end points of the graphic judged by the judging means and predetermined points in connection with the graphic. Therefore, it is unnecessary for a designer to assume and input a plane for model generation every time when a graphic is inputted. The coordinate calculating means calculates a model coordinate of the specified point in the coordinate system in the three-dimensional space by determining an intersection point between the plane for model generation generated by the plane-generating means and a projection line which connects the specified point on the projection plane to a view point for the object in the coordinate system in the three-dimensional space. The model data-generating means determines a position of the graphic in the coordinate system in the three-dimensional space and generates solid model data on the basis of the model coordinate calculated by the coordinate-calculating means and the graphic judged by the judging means. The display means converts each model coordinate of the solid model data generated by the model data-generating means into a coordinate in a display coordinate system and displays it on a display unit. Therefore, it is unnecessary to perform coordinate input and command input assuming a three-dimensional space every time when a graphic is inputted. The solid model can be generated only by inputting a graphic imaged by a designer.

When the graphic displayed on the display means is modified, the solid model data may be updated.

The term "graphic" referred to in the present invention includes those comprising a set of points, lines, faces or the like, and also includes characters, symbols or the like.

BRIEF DESCRIPTION OF THE DRAWINGS

FIGS. 7A through 7C illustrate an operation of Operator 2 (Make_Strut_Edge).

FIGS. 9A through 9C illustrate an operation of Operator 4 (Make_Inner_Loop).

FIGS. 14A through 14C illustrate an operation according to a rule (1) for loop information "Loop".

FIGS. 15A through 15C illustrate an operation according to a rule (2) for loop information "Loop".

DESCRIPTION OF THE PREFERRED EMBODIMENT

Figure 2:
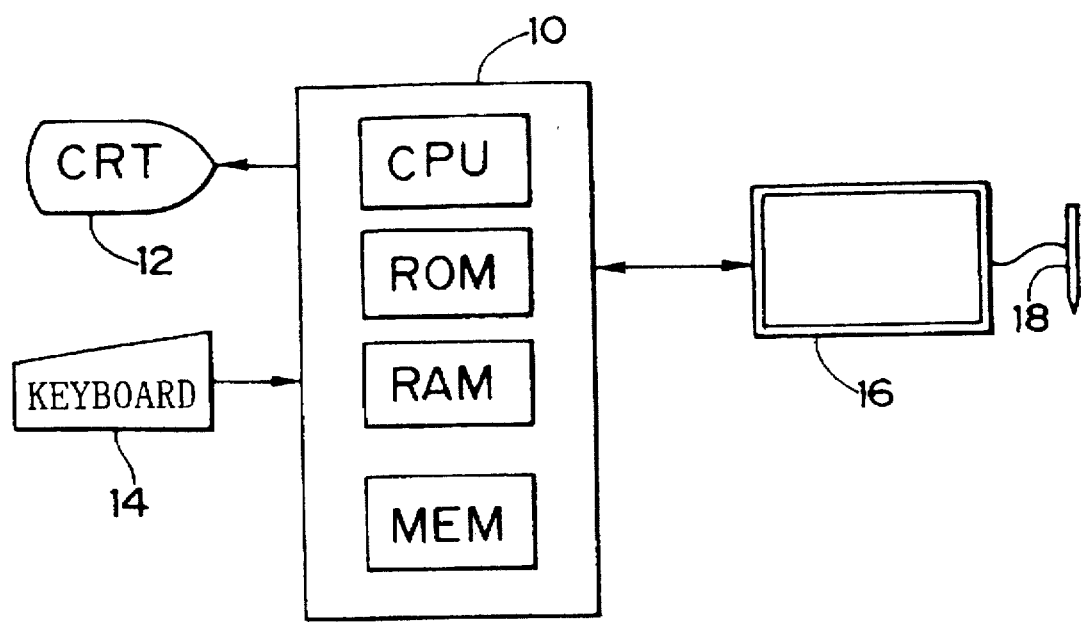
FIG. 2 shows a block diagram illustrating a schematic arrangement of the embodiment.

An embodiment of the present invention will be described in detail below with reference to the drawings. FIG. 2 shows a schematic arrangement of this embodiment. A computer 10 for graphic processing includes CPU, ROM, RAM, and a memory (MEM). In the memory (MEM) of this embodiment, conditions for automatically generating a model generation plane are stored, and Euler operators are previously stored. Details of the conditions for automatically generating the model generation plane and the Euler operators will be described below. A tablet 16 (or digitizer) is connected to the computer 10. An electronic pen 18 is connected to the tablet 16. A forward end of the electronic pen 18 is contacted with a surface of the tablet 16, and it is moved. By doing so, its locus of movement is converted into point sequence data to be inputted into the computer 10. This input operation can be also performed by using a keyboard 14 or a mouse (not shown). The tablet 16 of this embodiment is combined with a liquid crystal display unit. The tablet is used to display, for example, a menu on a screen of the liquid crystal display unit. Thus it becomes easy to perform menu selection with the electronic pen, data input with the electronic pen, etc. It is also possible to connect a display device (hereinafter referred to as "CRT") 12 as an option for displaying the same image as that on the liquid crystal display unit. ROM of the computer 10 stores a program for a control routine for graphic processing described below.

In this embodiment, in order to render an object imaged by a designer on the liquid crystal display unit of the tablet 16 as a model, the electronic pen 18 is allowed to slide on the surface of the tablet 16 to display its locus. Therefore, the plane on the tablet 16 is considered as a projection plane onto which the object is projected. A method for automatically converting coordinates on the model projection plane as a two-dimensional plane into coordinates in a three-dimensional space will be explained below.

Figure 3:
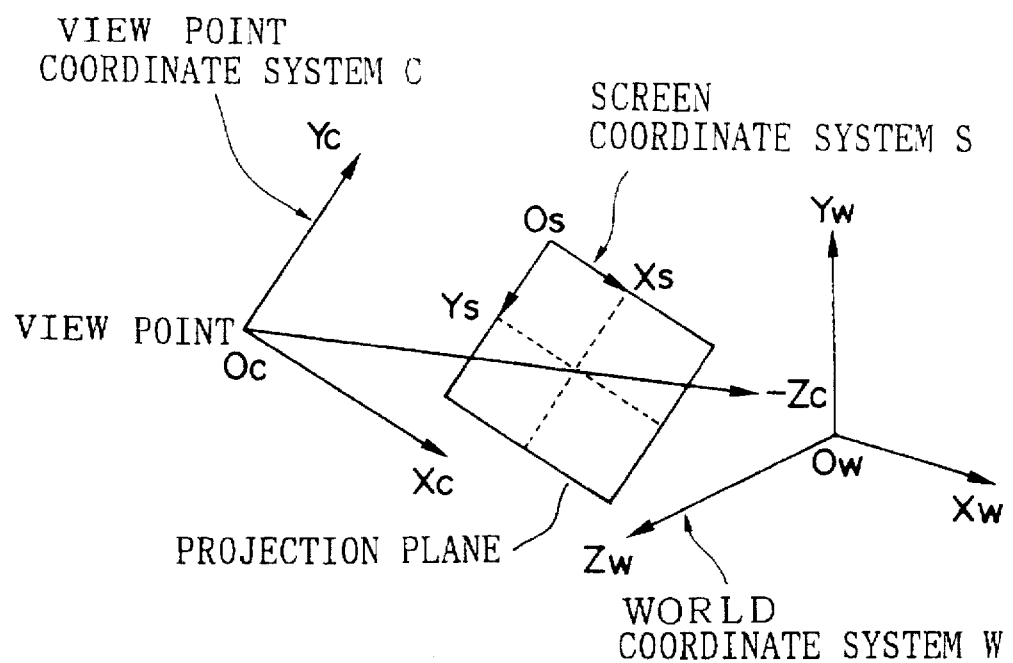
FIG. 3 shows coordinate systems for handling a three-dimensional model by using a computer.

As shown in FIG. 3, the following three type of coordinate systems are usually used when a projective view of a three-dimensional model is handled by using a computer.

1) World coordinate system W (World Coordinate): a coordinate system which serves as a reference for all coordinate systems; in this embodiment, coordinate values of a model for representing an object are also handled by using the world coordinate system;

2) View point coordinate system C (Camera Coordinate): a coordinate system which uses a coordinate of a view point of human as an origin;

3) Screen coordinate system S (Screen Coordinate): a two-dimensional coordinate system on the liquid crystal display screen of the tablet 16.

Coordinate values of a model placed in the world coordinate system W are firstly converted into coordinate values in the view point coordinate system C, and then they are projected and converted into coordinate values in the screen coordinate system S as a projection plane for the model to be displayed on the liquid crystal display screen of the tablet 16.

Figure 4:
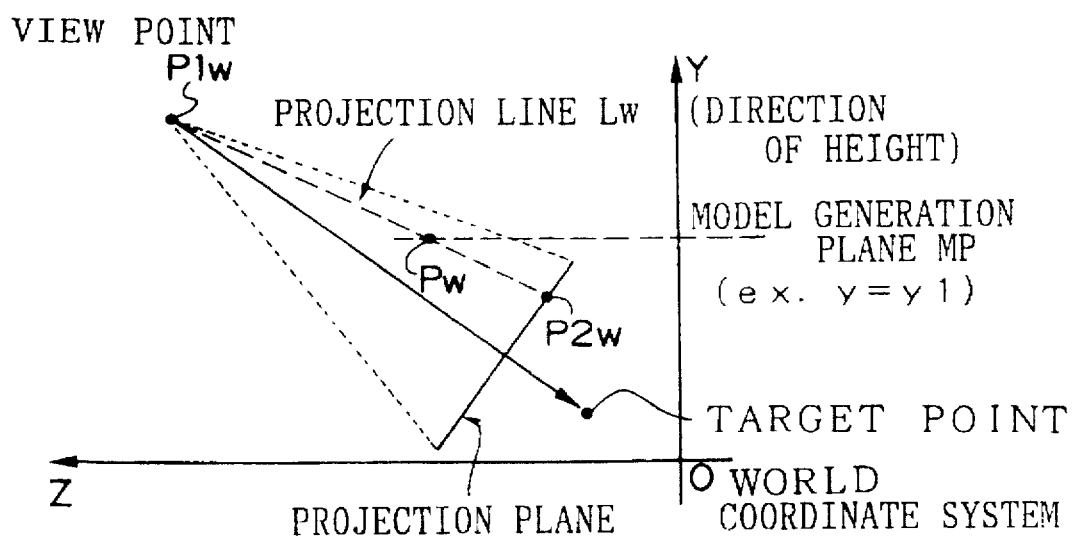
FIG. 4 shows determination of a coordinate value of a solid model.

Therefore, when a two-dimensional coordinate of the model projected onto the screen are given as shown in FIG. 4, a three-dimensional coordinate of the model in an actual three-dimensional space (hereinafter referred to as "model coordinate") exists on any point on a straight line Lw (this line is temporarily referred to as "projection line Lw") for connecting a view point coordinate P1w and a screen coordinate P2w in the world coordinate system W.

Now, in order to identify the position of a model coordinate Pw on the projection line lw, a concept of model generation plane MP is introduced. The "model generation plane" is a plane in the world coordinate system W, wherein a two-dimensional coordinate of an inputted model exists on the plane. If a two-dimensional coordinate inputted on the screen is previously known to locate on a certain position on the model generation plane MP, an actual model coordinate can be determined by calculating an intersection point between the projection line Lw and the model generation plane MP.

When an existing conventional CAD system is used to make direct coordinate indication on a screen for projection of a model, it is necessary to sequentially set a model generation plane MP before performing the coordinate indication. Accordingly, its operation becomes complicated. Thus in this embodiment, the setting operation for the model generation plane MP is made unnecessary by setting the following four conditions during input of edges of a model so that the operability is improved. However, the following assumption is for a case in which linear edges are inputted.

[Conditions]

(1) A first point exists on a plane having a height of zero (coordinate value in the direction of the Y axis).

(2) At least one of end points of a line segment is necessarily drawn on an existing line segment.

(3) A line segment drawn on the Y axis (direction of height) is firstly considered as a vertical edge.

(4) A line segment, which is not parallel to the Y axis, is considered as a horizontal edge.

(5) A line drawn on an existing plane is considered to exist on the plane.

Taking the conditions described above into consideration, the model generation plane MP is automatically set as follows. At first, with reference to the condition (1), a first point is allowed to have a model generation plane MP as Y=0. With reference to the condition (2), one of end points of a line segment necessarily exists on an existing line segment, and hence a coordinate of the point can be determined by dividing the existing line segment in proportion. If the other end point does not exist on an existing line segment, a model generation plane hip is set in accordance with the conditions (3), (4), and (5). Namely, with reference to the condition (3), a plane, which includes an inputted line segment and is perpendicular to an XZ component vector of a projection line, is used as a model generation plane MP. With reference to the condition (4), a horizontal plane including a Y coordinate of an end point on an existing line segment is used as a model generation plane MP. With reference to the condition (5), an existing plane is used as a model generation plane MP.

Next, a method for automatically constructing solid model data in response to addition and modification of model edges will be explained.

The solid model data of this embodiment have a solid model data structure of the split edge boundary expression system. In the split edge boundary expression system, a solid can be expressed by using its boundary surfaces, having a structure with the following main phase elements. The solid is constituted by faces. Each face comprises edges which constitute it. Each edge has vertexes at both ends.

Figure 5:
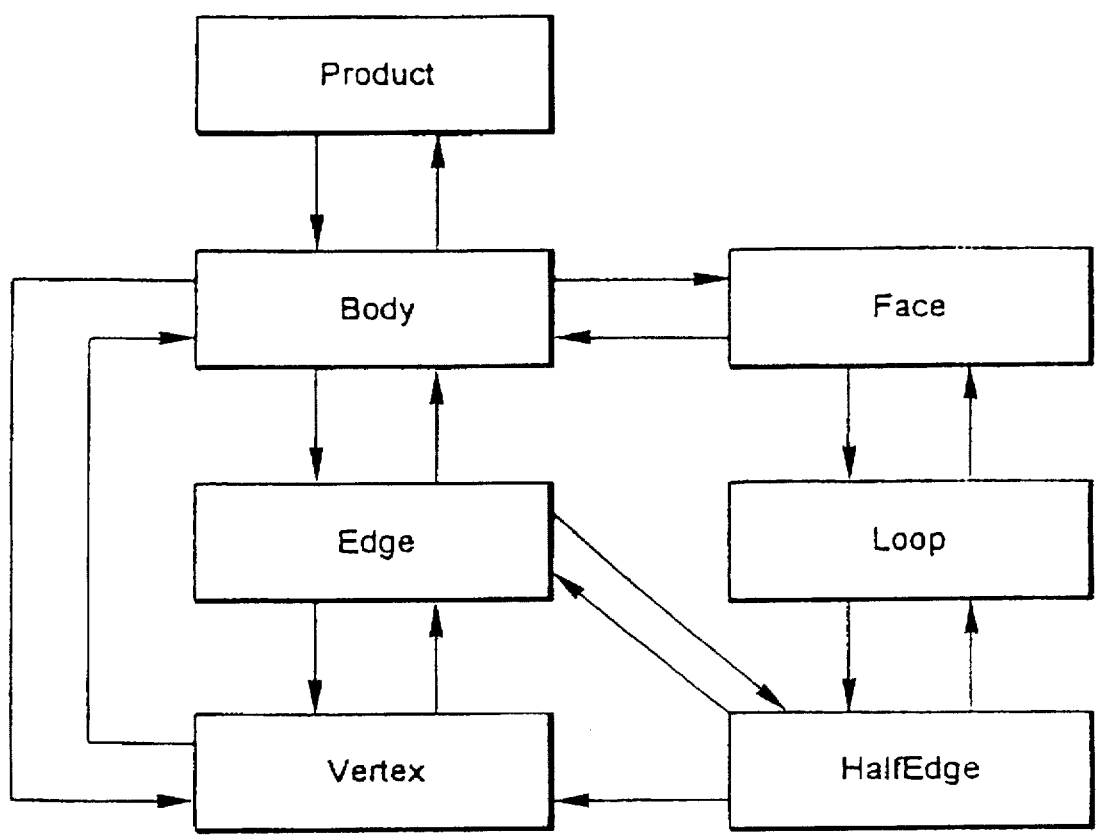
FIG. 5 shows a data structure of solid model data of the embodiment.

As shown in FIG. 5, information "Product" is a retrieval node for all data. Information "Body" has retrieval nodes of face "Face", edge "Edge", and vertex "Vertex" as information on a model. Such a split edge boundary expression system is characterized in that each of edges of a model has a pair of vector information, each information in the pair indicating opposite directions and being called half edge information "Half Edge", wherein the phase of a model configuration is maintained by using linking information "Loop" over the half edge information. The information as described above is information for representing only a linking status of boundary surfaces possessed by the model, which is also called phase information (phase element, or topology).

Apart from the phase information, information for representing an actual configuration of a model includes geometry information (geometry element, or geometry) such as curved face (surface, or configuration of face) associated with the face "Face", curved line (curve, or configuration of line) associated with the edge "Edge", and point (point, or three-dimensional coordinate value) possessed by the vertex "Vertex".

In order to construct and maintain the data structure as described above in response to addition and modification of edges of the model, the embodiment uses seven new Euler operators described below, in addition to the well-know Euler operator. The Euler operator corresponds to a program routine for keeping the phase of the model configuration, referring to an operation to derive an adjoining relationship between the pieces of information described above while maintaining the phase of the model configuration.

[Euler operators]

Figure 6B:
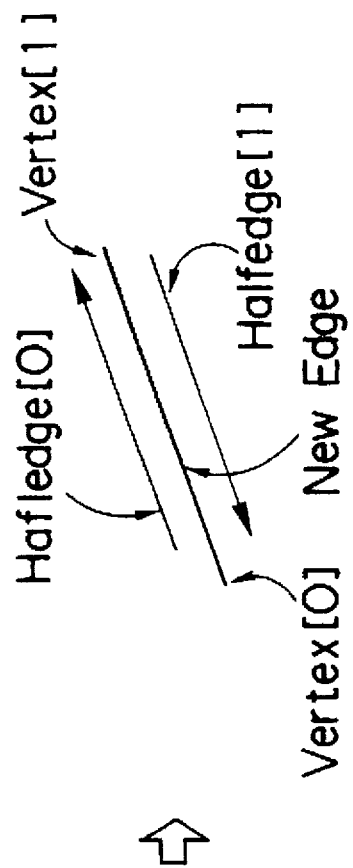
FIGS. 6A and 6B illustrate an operation of Operator 1 (Make_Body).
Figure 6A:
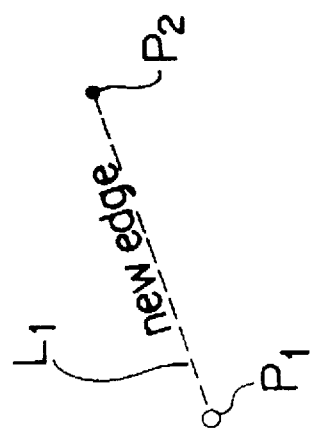

Operator 1: Make_Body
Operator 2: Make_Strut_Edge
Operator 3: Make_Face
Operator 4: Make_Inner_Loop
Operator 5: Delete_Edge
Operator 6: Break_Edge
Operator 7: Extend_Edge As shown in FIGS. 6A and 6B, Operator 1 (Make_Body) is applied when a first line segment is inputted. Namely, when a new line $L_1$ with a first point $P_1$ as a starting point and with a second point $P_2$ as an end point is inputted (see FIG. 6A), the new line $L_1$ is allowed to correspond to a new edge "New Edge". A first vertex "Vertex [0]" and a second vertex "Vertex [1]" of the edge "New Edge" are determined, and pieces of half edge information in opposite directions "Half Edge [0]", "Half Edge [1]" are determined (see FIG. 6B).

As shown in FIGS. 7A through 7C, Operator 2 (Make_Strut_Edge) is applied when only one end point exists on an existing line segment. Namely, when a new line $L_2$ is inputted (see FIG. 7B) with respect to three edges "Edges [0], [1], [2]" accompanying half edge information (see FIG. 7A), the new line $L_2$ is allowed to correspond to a new edge "Edge [3]", and half edge information in opposite directions "Half Edge [0]", "Half Edge [1]" are determined (see FIG. 7C). In this case, the existing edge "Edge [2]" relative to the edge "Edge [3]" is an edge "Strut Edge" for the existing line segment like a branch formed from the edges "Edges [0], [1]". One of the half edge information on the edge "Edge [2]" is set for a linking candidate "pNextHedge". Details of Operator 2 (Make_Strut_Edge) will be described later.

Figure 8A:
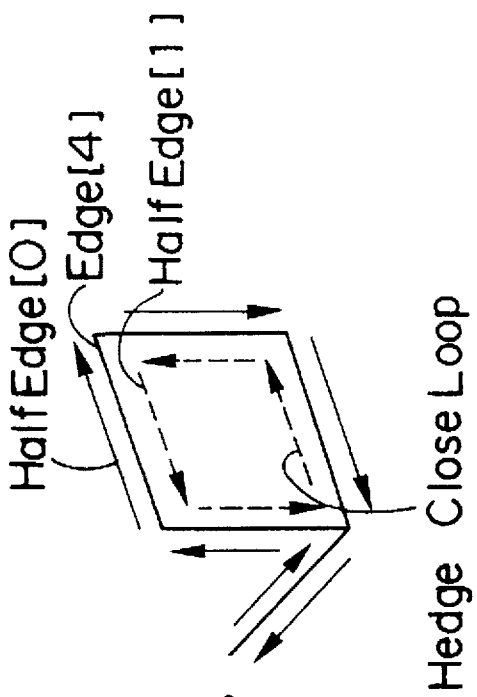
FIGS. 8A through 8C illustrate an operation of Operator 3 (Make_Face).
Figure 8B:
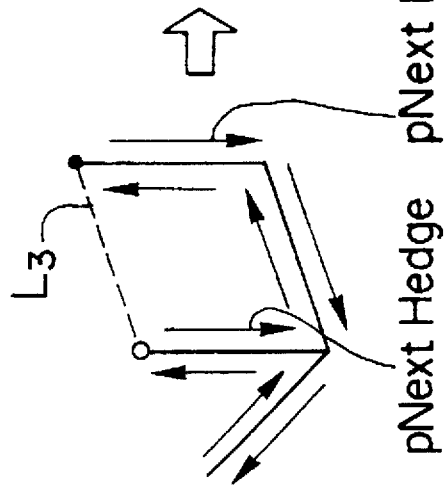
Figure 8C:
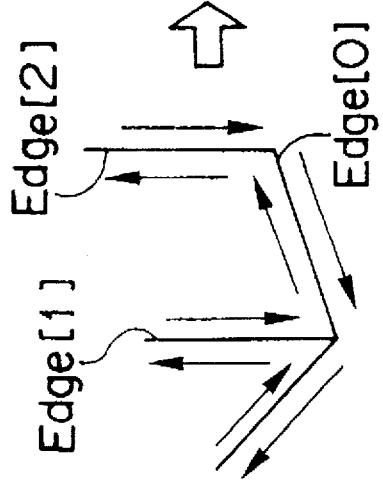
Figure 10A:
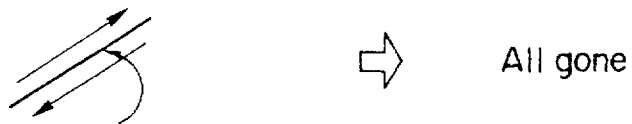
FIGS. 10A through 10G illustrate an operation of Operator 5 (Delete_Edge).
Figure 10B:
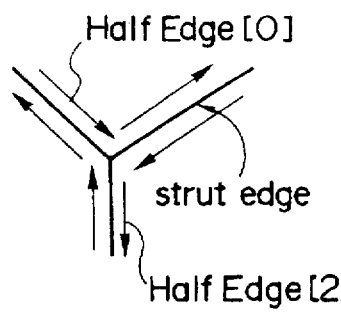
Figure 10C:
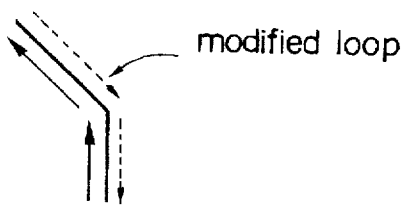
Figure 10D:
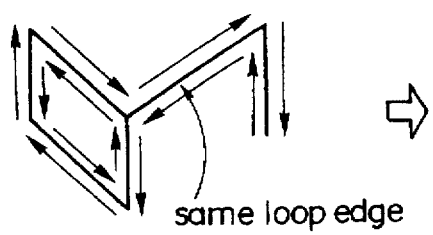
Figure 10E:
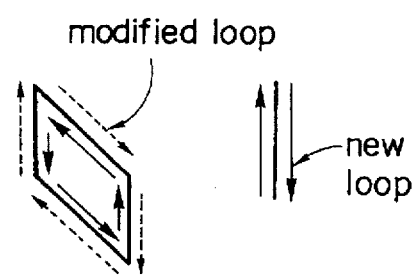
Figure 10F:
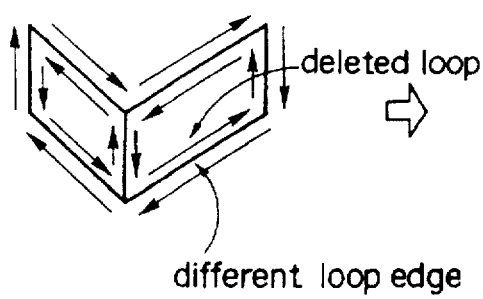
Figure 10G:
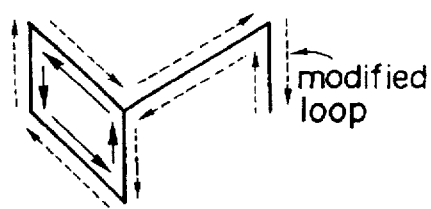

As shown in FIGS. 8A through 8C, Operator 3 (Make_Face) is applied when a face is formed by addition of a line segment. Namely, when a new line $L_3$ is inputted (see FIG. 8B) with respect to two edges of three edges "Edges [0], [1], [2]" accompanying half edge information (see FIG. 8A), the new line $L_3$ is allowed to correspond to a new edge "Edge [4]", and half edge information in opposite directions "Half Edge [0]", "Half Edge [1]" are determined (see FIG. 8C). For the existing edges "Edges [1], [2]" relative to the edge "Edge [4]", half edge information are set on a pair of linking candidates "pNextHedge", and half edge information included within the edges "Edges [0], [1], [2], [4]" are determined to form a closed loop "Close Loop". Details of Operator 3 (Make_Face) will be described later.

As shown in FIGS. 9A through 9C, Operator 4 (Make_Inner_Loop) is applied when an isolated line segment is drawn within an existing face. Namely, a step, in which an edge "Edge [5]" accompanying half edge information is determined within a face "Face" formed by edges "Edges [0], [1], [2], [3]" (see FIG. 9A), is considered to be a pre-step for sequentially forming edges to form a closed loop (see FIG. 9B), and proliferating a new edge or the like from the edges (see FIG. 9C).

As shown in FIGS. 10A through 10G, Operator 5 (Delete_Edge) is applied when an existing line segment is erased. The following four cases should be considered for Operator 5. The first case relates to erasure of an independent line segment (see FIG. 10A). In this case, all are erased. The second case relates to erasure of an edge "Strut Edge" of an existing line segment like a branch formed from existing edges as explained for Operator 2 (Make_Strut_Edge) (see FIG. 10B). In this case, the edge "Strut Edge" and half edge information are erased so that loop information is formed by "Half Edges [0], [2]". Namely, it is intended to make a relationship between half edge information (see FIG. 10C). The third case relates to erasure of one line segment (or an edge thereof, "same loop edge") included within continuous edges which form one loop (see FIG. 10D). In this case, the corresponding edge and half edge information are erased so that an edge of a line segment which becomes independent as a result of the erasure is made into an independent new edge, and a loop which becomes independent is allowed to form modified loop information "modified loop". Namely, it is intended to make a relationship between half edge information (see FIG. 10E). The fourth case relates to erasure of one line segment (or an edge thereof, "different loop edge") of edges continued within any one loop for forming a plurality of different loops (see FIG. 10F). In this case, the corresponding edge and half edge information are erased, and an independent loop "deleted loop" disappears as a result of the erasure. Accordingly, modified loop information "modified loop" is formed so that the independent loop belongs to an existing loop. Namely, it is intended to make a relationship between half edge information (see FIG. 10G).

Figure 11A:
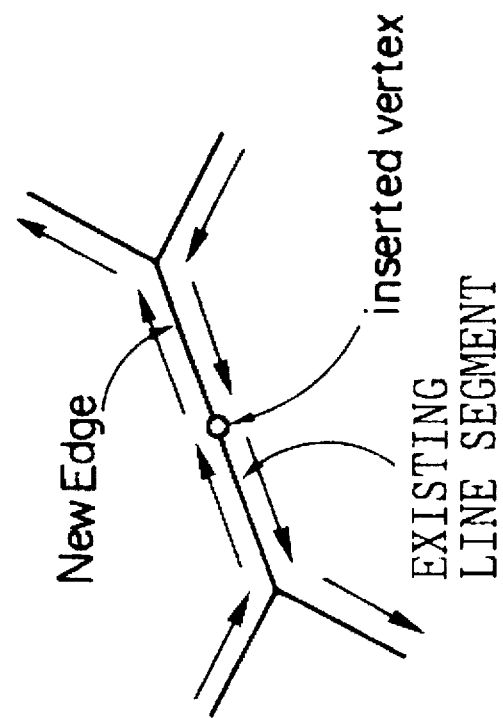
FIGS. 11A and 11B illustrate an operation of Operator 6 (Break_Edge).
Figure 11B:
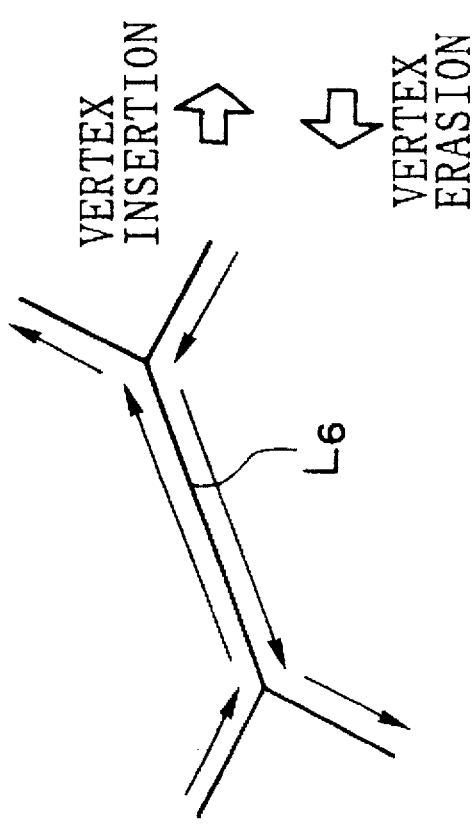

As shown in FIGS. 11A and 11B, Operator 6 (Break_Edge) is applied when an existing line segment is divided. Namely, when an existing line segment $L_6$ is divided (see FIG. 11A), a vertex is inserted into a position of division on the line segment. One divided by the inserted vertex is regarded as an edge of the existing line segment $L_6$, and the other is regarded as an edge "New Edge" of a new line segment (see FIG. 11B). On the contrary, when a continuous edge is synthesized through a vertex, the method described above may be used, but it proceeds reversely. Actually, a routine for inserting a vertex into a line segment, and a routine for erasing a vertex from a line segment are provided.

Figure 12A:
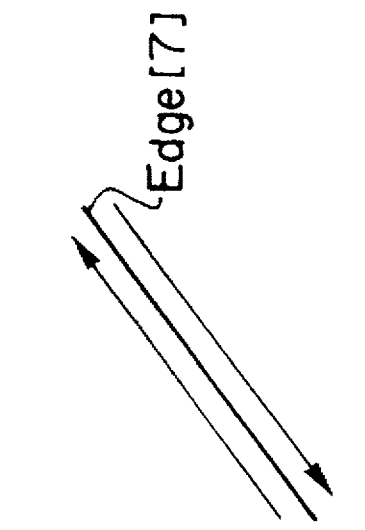
FIGS. 12A through 12C illustrate an operation of Operator 7 (Extend_Edge).
Figure 12B:
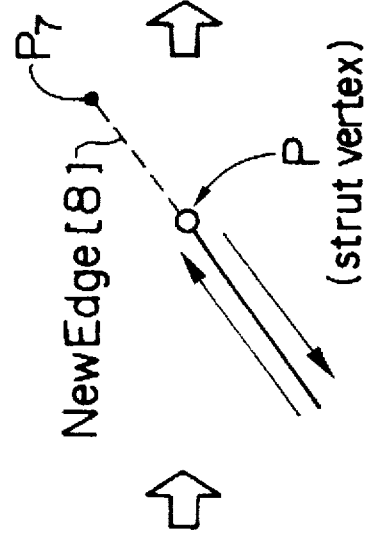
Figure 12C:
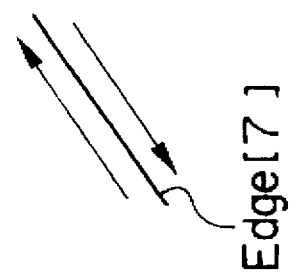

As shown in FIGS. 12A through 12C, Operator 7 (Extend_Edge) is applied when an existing line segment is extended. Namely, when a point of extension $P_7$ is indicated for an edge "Edge [7]" of an existing line segment $L_7$ (see FIG. 12A), and an edge "Edge [8]" is formed from a vertex P "strut vertex" of the edge "Edge [7]" to the point of extension $P_7$ (see FIG. 12B), then the existing edge "Edge [7]" is extended, and the formed edge "Edge [8]" is erased (see FIG. 12C).

In this embodiment, the phase of a solid model is manipulated by using the seven Euler operators described above.

Next, details of the Euler operators, namely Operator 2 (Make_Strut_Edge) and Operator 3 (Make_Face) described above, will be further explained.

Figures 13A, 13B, 13C:
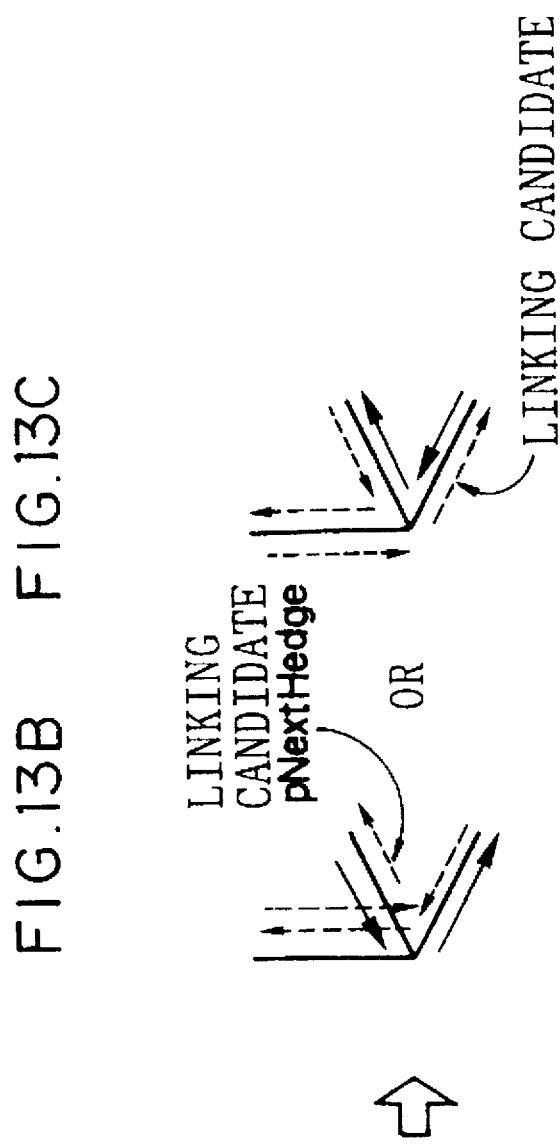
FIGS. 13A through 13C illustrate an operation of Operator 2 (Make_Strut_Edge).

As for Operator 2 (Make_Strut_Edge) described above, a situation may occur in which it is indefinite what existing half edge information is allowed to have linking information. For example, as shown in FIG. 13A, when it is intended to connect a new line segment $L_A$ as an edge to a vertex portion of existing line segments $L_B$, $L_C$ as edges, existing half edge information to which half edge information of the new line segment $L_A$ is linked, that is a linking candidate "pNextHedge", may be either inner half edge information (see FIG. 13B) or outer half edge information (see FIG. 13C).

Thus in this embodiment, the following knowledge has been obtained. Namely, the loop information "Loop" as linking information on half edge information is categorized (classified) in accordance with its property as follows, and a suitable linking candidate can be selected substantially automatically by setting rules described below.

[Classification of loop information]
(a) closed loop (Closed_Loop): a loop constituted by edges of a closed face;
(b) opened loop (Opened_Loop): loops other than (a).

[Rules]
(1) When a new line segment is inputted, if a loop of a linking candidate is open, then higher priority is given to the candidate.
(2) If an end point of a new line segment is located on a face of a closed loop, higher priority is given to a linking candidate of the closed loop (FIGS. 13A through 13C).

For example, as for the rule (1), a case is assumed in which there are a closed loop and an opened loop as shown in FIG. 14A, and an edge "Edge [D]" is formed from a point $P_D$ as shown in FIG. 14B. In such a case, priority is given to a linking candidate of the opened loop as shown in FIG. 14C.

As for the rule (2), a case is assumed in which an edge "Edge [d]" is formed from a point $P_D$ to a point Pd on a face of a closed loop as shown in FIG. 15B. In such a case, priority is given to a linking candidate of the closed loop as shown in FIG. 15C.

After the priority is given to the linking candidate as described above, loop information of the linking candidate is classified as follows.

[Classification]
(c) counter-clockwise loop (CCW_Loop): loop information which forms a counterclockwise loop as viewed from a view point of a user when half edge information of a new line segment is linked (in this system, a face having a counterclockwise loop is regarded as a front face);
(d) clockwise loop (CW_Loop): loop information which forms a clockwise loop as viewed from a view point of a user.

The linking candidate is determined in accordance with the following rules.

Figure 16A:
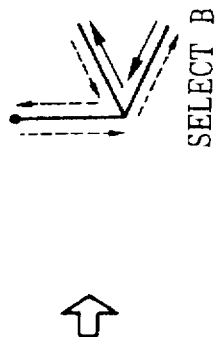
FIGS. 16A through 16I illustrates an operation according to rules (3) through (5) for loop information "Loop".
Figure 16B:
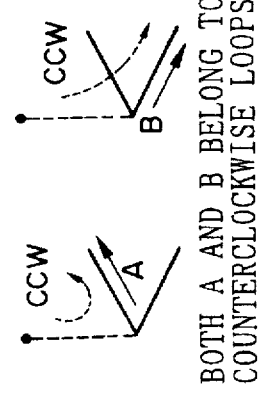
Figure 16C:
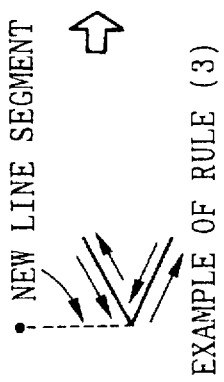
Figure 16D:
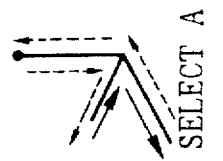
Figure 16E:
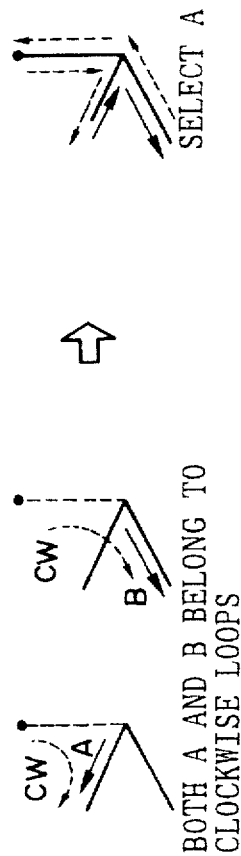
Figure 16F:
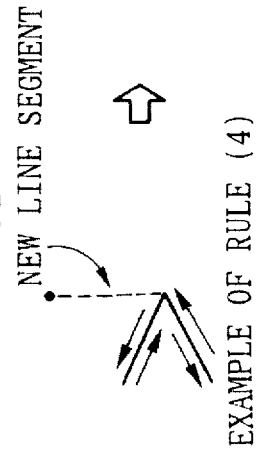
Figure 16G:
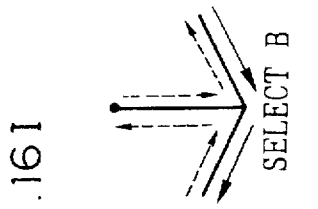
Figure 16H:
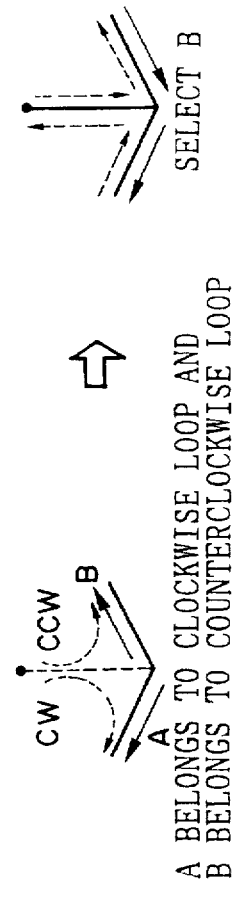
Figure 16I:
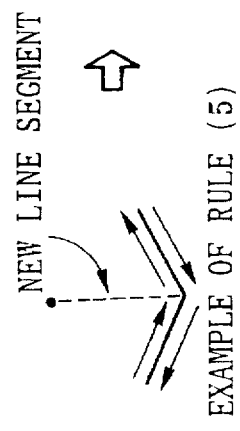

[Rules]
(3) If all linking candidates belong to counterclockwise loops, a linking candidate closest to a user is selected (see FIGS. 16A through 16C).
(4) If all linking candidates belong to clockwise loops, a linking candidate farthest from a user is selected (see FIGS. 16D through 16F).
(5) If linking candidates belong to both counterclockwise and clockwise loops, a counterclockwise linking candidate closest to a user is selected (see FIG. 16G through 16I).

If the priority is given by using the classification (a) to (d) and the rules (1) to (5) as described above, a suitable linking candidate can be automatically selected.

When a face is formed by Operator 3 (Make_Face) described above, linking candidates are selected at both end points of a new line segment. If a pair of selected information adapt to the condition of face formation, a face and loop information are newly prepared.

Detailed explanation for the other Euler operators is omitted.

Next, the operation of this embodiment will be explained with reference to FIGS. 17 to 21 and in accordance with a control routine for graphic processing in FIG. 1 for converting an inputted two-dimensional graphic into a three-dimensional solid model and displaying it.

Figure 17:
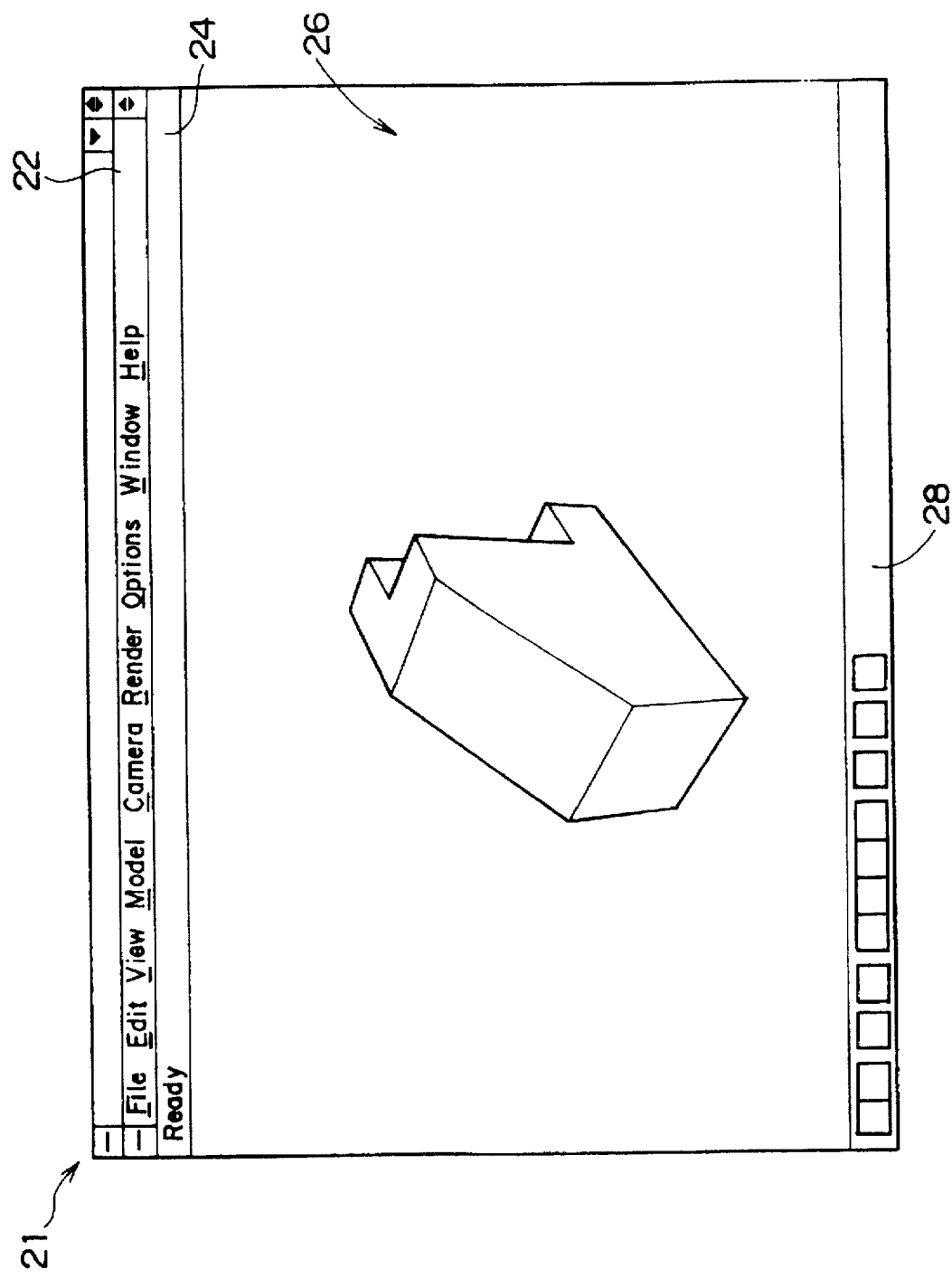
FIG. 17 shows an arrangement of a screen on a liquid crystal display unit on a tablet.

FIG. 17 shows an arrangement of a screen displayed on the liquid crystal display unit on the tablet 16. The screen 21 displayed on the liquid crystal display unit comprises a menu bar 22 for indicating necessary operations, a status bar 24 for displaying a current status, an input and display screen 26 for performing graphic input and displaying a solid model, and an icon menu bar 28 for making instruction upon view point movement or the like. The following explanation will be made by using the input and display screen 26. With reference to the accompanying drawings, a procedure for making a solid model in accordance with the isometric drawing method will be explained.

Figure 1:
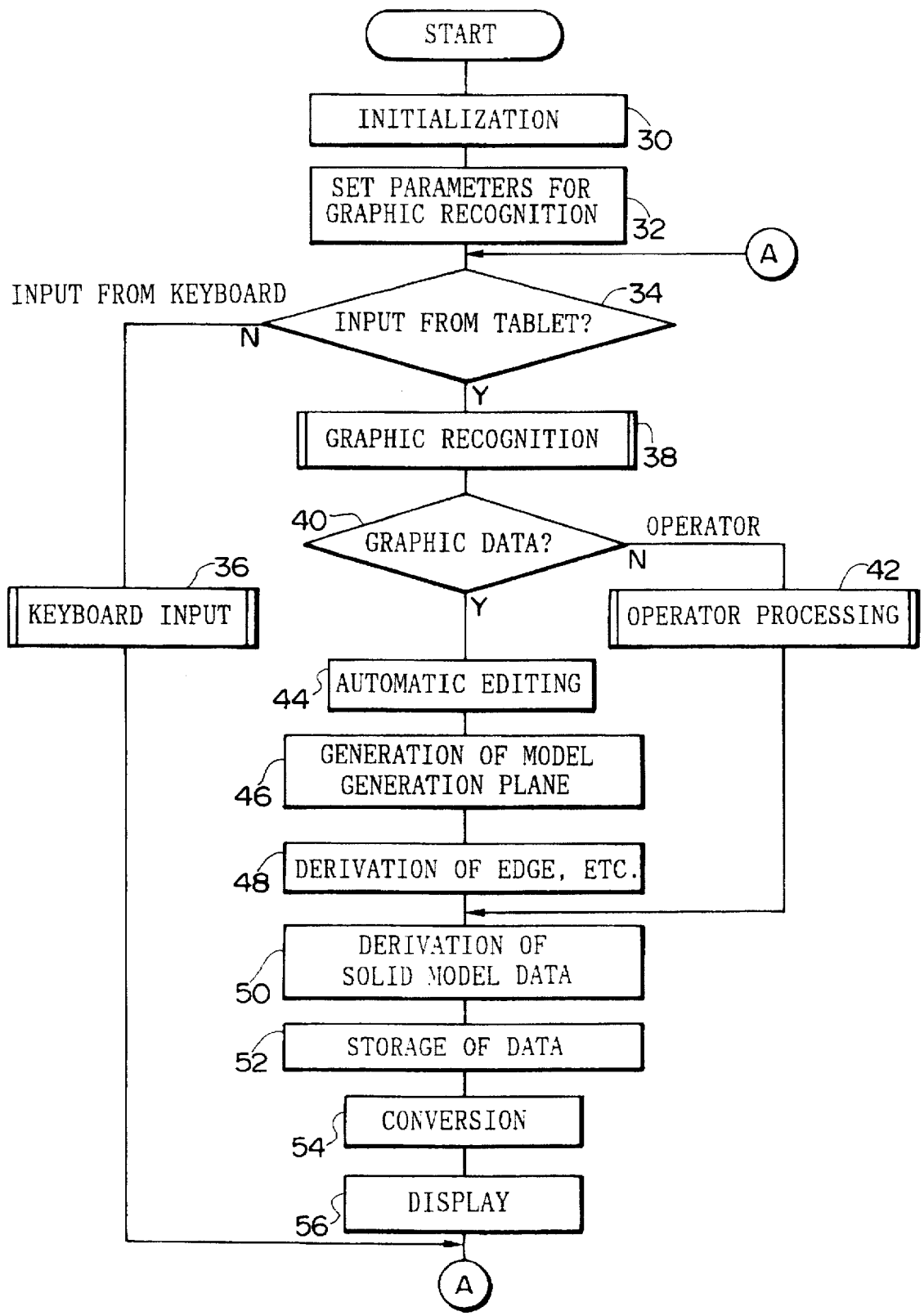
FIG. 1 shows a flow diagram illustrating a control routine of an embodiment.

When a switch of the graphic input and output apparatus is turned on, the routine shown in FIG. 1 is started. Initialization is performed in a step 30, and parameters for graphic recognition are set in a step 32. The parameters are used to judge, for example, whether or not point sequence data inputted from the tablet are approximated by a line segment, a circle, or a circular arc in geometry. In this procedure, three-dimensional reference axes X, Y, and Z are displayed (see FIG. 18A) to make it easy for a designer to sketch a solid model. In the next step 34, it is judged whether the data are inputted from the tablet 16 or the data are inputted from the keyboard 14. If it is judged that the data are inputted from the keyboard, then keyboard input processing is executed in a step 36. The keyboard input processing includes selection of a function of end from the menu displayed on CRT or the tablet, and functions other than the function of end (for example, change in size of parameter for graphic processing, storage of graphic data base, reading, erasing, hard copy, all clear, and help).

Figure 18A:
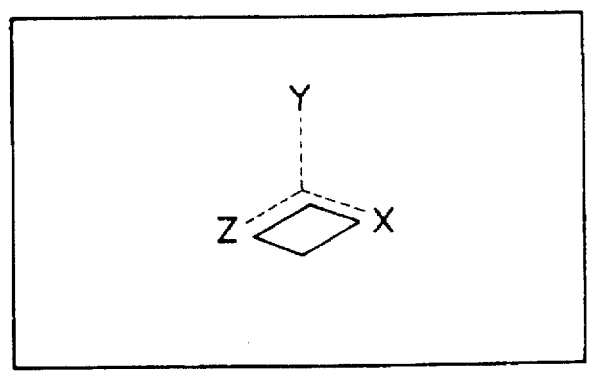
FIGS. 18A through 18C illustrate a process of forming a solid model.

On the other hand, if it is judged in the step 34 that the data are inputted from the tablet, graphic recognition processing is performed in a step 38 as a judging means. As shown in FIG. 18A, when bases of the solid model is made, lines are inputted one by one by using the electronic pen 18. Point sequence data upon the input are recognized as lines. In the next step 40, it is judged whether the graphic recognized in the step 38 is a graphic to be made or an operator for erasure of a designated line segment (edge) or the like. In the case of the graphic to be made, automatic editing processing is performed in a step 44, and then a model generation plane MP for the graphic (recognized in the step 38) is generated in a step 46 as explained above. In an example in FIG. 18A, automatic adjustment is made in the automatic editing processing so that the recognized line is parallel to any one of the three-dimensional reference axes X, Y, and Z (an axis which is geometrically closest). In the next step 48, a projection line for connecting a view point to a point on the projection plane (tablet) is generated in the coordinate system in the three-dimensional space as described above. An intersection point between the generated model generation plane and the projection line is determined to derive an edge, etc. In the next step 50, solid model data are derived by using the derived edge, etc., and the data are stored in the next step 52. Upon derivation of the solid model data in the example in FIG. 18A, a face is automatically recognized at a point of time when a fourth line segment is inputted, and a closed region is formed. The stored data (three-dimensional) are converted into two-dimensional coordinates in the next step 54, which are displayed on the tablet in the next step 56.

If it is judged in the step 40 that an operator is provided, operator processing is performed in a step 42. After that, data after the operator processing are stored in the step 52.

Figure 18B:
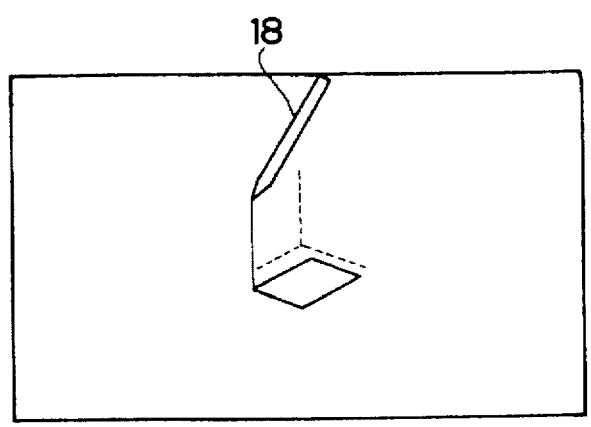
Figure 18C:
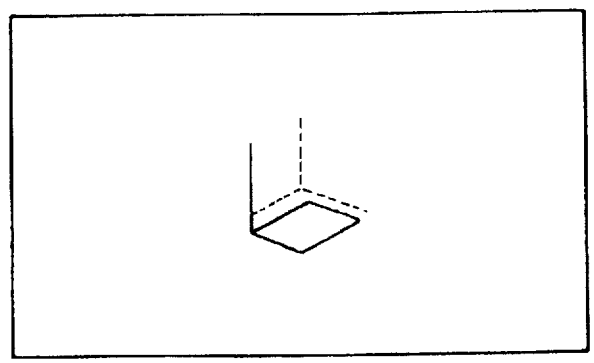
Figure 19A:
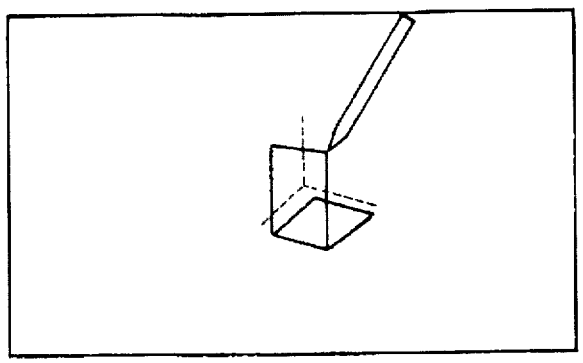
FIGS. 19A through 19C illustrate a process of forming a solid model.
Figure 19B:
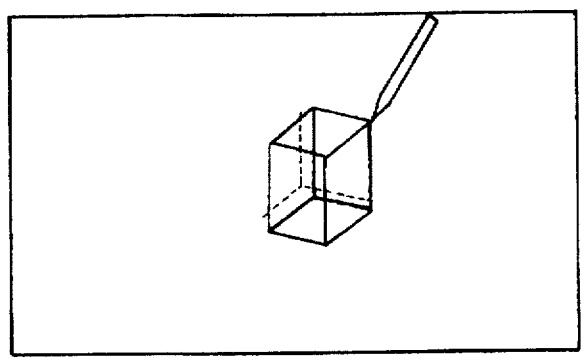
Figure 19C:
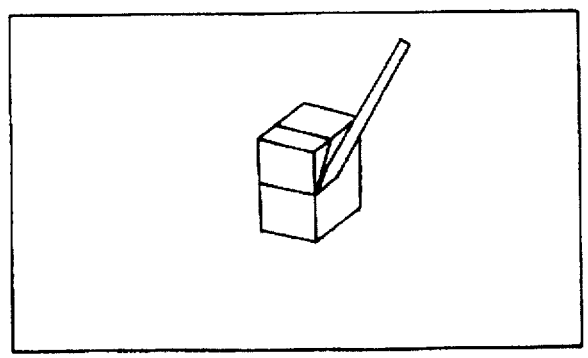

The base portion of the solid model has been formed as described above. When a box-shaped solid model having the bases is made, vertical lines are inputted as shown in FIG. 18B. It is indefinite whether the vertical lines belong to front face lines or back face lines. Accordingly, an inquiry is made to a designer, and the routine follows a result of the inquiry. In this case, the lines represent sides of a front face, and hence they are established as front face lines (FIG. 18C). Next, sides of the box are sequentially inputted respectively (see FIGS. 19A and 19B). Upon input of a line segment, if an unnecessary line segment section is generated at a portion of synthesis thereof, it is automatically trimmed. In such a manner, a solid model as a hexahedron comprising twelve sides (edges) is automatically recognized. Accordingly, hidden lines can be also displayed by using dotted lines as shown in FIG. 19B.

Figure 20A:
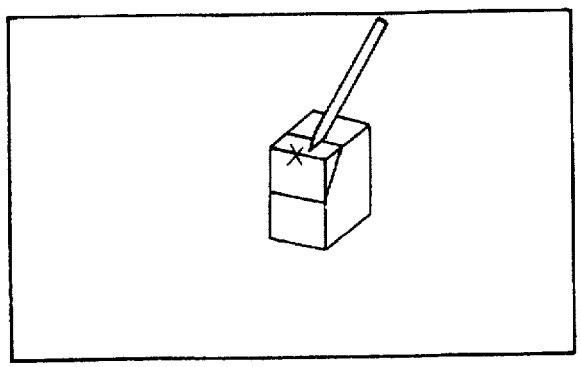
FIGS. 20A through 20C illustrate a process of forming a solid model.
Figure 20B:
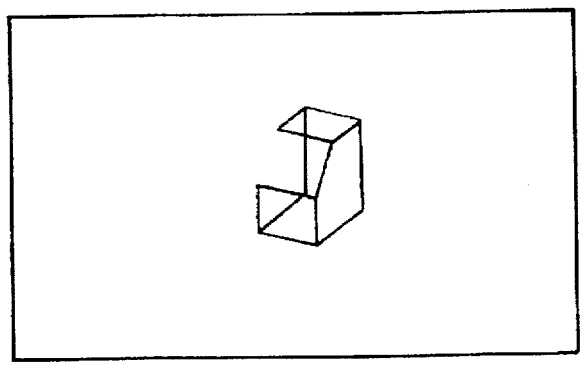
Figure 20C:
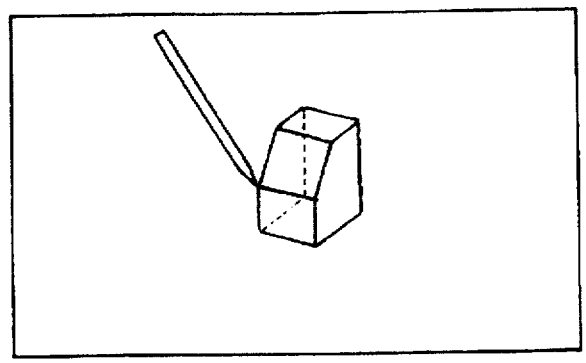
Figure 21A:
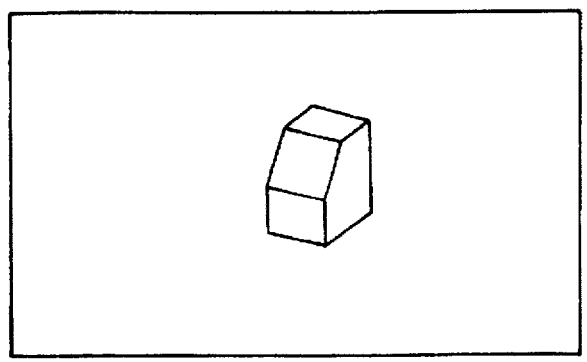
FIGS. 21A through 21C illustrate a process of forming a solid model.
Figure 21B:
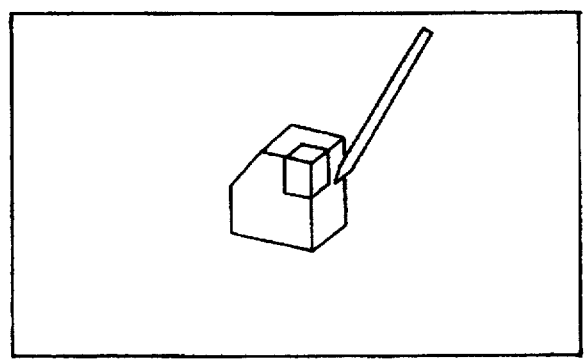
Figure 21C:
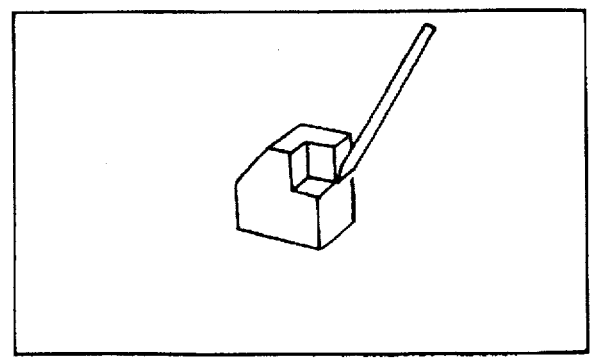

Next, modification is made so that the shape of the solid model as a hexahedron is changed to a shape in which a corner is cut. Namely, after line segments for dividing each of faces are inputted (FIG. 19C), instruction is made to erase unnecessary line segments (edges) (FIG. 20A), and the unnecessary line segments are successively selected and erased. Thus a solid model, from which the unnecessary line segments are removed, is displayed (FIG. 20B). Accordingly, a necessary line segment is added (FIG. 20C). Addition of the line segment automatically generates an oblique side and a wall face. At this point of time, if the display for the back face is turned off by selection with the icon menu bar 28, the solid model with no display for the back face can be displayed as shown in FIG. 21A. It is also possible to change the view point as shown in FIG. 21B by selection with the icon menu bar 28.

Next, when a corner of the heptahedron is further modified, each of faces is divided (FIG. 21B), unnecessary lines are erased, and deficient lines are added (FIG. 21C) to complete a solid model.

The graphic input and output apparatus of this embodiment also makes it possible to add shading to each of faces, enter dimensions, and use a three-point perspective projection method and a two-point perspective projection method as well as the isometric drawing method.

As described above, a three-dimensional model can be made from a two-dimensional projective view. Accordingly, it is unnecessary to assume a three-dimensional coordinate system and perform complicated operations as done in the conventional three-dimensional CAD system. A designer can make a solid model by rendering an object close to those imaged.

In this embodiment, command selection for inputting a model configuration can be made unnecessary. Two-dimensional coordinates on a projected illustration of a model (isometric view and perspective view) can be automatically converted into three-dimensional coordinates.

In this embodiment, solid model data can be automatically constructed in response to addition and modification of edges of a model.

According to the present invention as described above, a plane for model generation is automatically generated. Accordingly, the following effects are provided. Namely, it is unnecessary to previously convert a solid image into numerical coordinate values, and select commands during input. A solid model can be automatically generated with a feeling of sketch only by inputting a model configuration imaged by a designer into a tablet as it is.

What is claimed is:

1. A graphic input and output apparatus comprising:

an input means including an electronic pen and tablet corresponding to a projection plane for an object in a predetermined coordinate system in a three-dimensional space for inputting a configuration of the object to be made, the input means converting a locus of the electronic pen on the tablet into point sequence data and inputting them;

a judging means for judging a certain graphic in geometry represented by the locus on the basis of the inputted point sequence data;

a plane-generating means for generating a plane for model generation in the coordinate system in the three-dimensional space in accordance with predetermined conditions by using any specified point selected from vertexes and end points of the graphic judged by the judging means and predetermined points in connection with the graphic by a process of projecting the specified point onto the projection plane;

a coordinate-calculating means for calculating a model coordinate of the specified point in the coordinate system in the three-dimensional space by determining an intersection point between the plane for model generation generated by the plane-generating means and a projection line which connects the specified point on the projection plane to a view point for the object in the coordinate system in the three-dimensional space;

a model data-generating means for determining a position of the graphic in the coordinate system in the three-dimensional space and generating solid model data on the basis of the model coordinate calculated by the coordinate-calculating means and the graphic judged by the judging means; and a display means for converting each model coordinate of the solid model data generated by the model data-generating means into a coordinate in a display coordinate system and displaying it on a display unit.

2. An apparatus according to claim 1, wherein the solid model data is updated when the graphic displayed on the display means is modified.

3. An apparatus according to claim 1, wherein the input means including a mouse and/or a track ball, and converting a locus of the mouse and/or the track ball.

4. A graphic input and output method comprising:

inputting a configuration of an object to be made through an input device including an electronic pen and a tablet corresponding to a projection plane for the object in a predetermined coordinate system in a three-dimensional space, and converting a locus of the electronic pen on the tablet into point sequence data;

judging a certain graphic in geometry represented by the locus on the basis of the inputted point sequence data;

generating a plane for model generation in the coordinate system in the three-dimensional space in accordance with predetermined conditions by using any specified point selected from vertexes and end points of the graphic judged in the judging step and predetermined points in connection with the graphic by a process of projecting the specified point onto the projection plane;

calculating a model coordinate of the specified point in the coordinate system in the three-dimensional space by determining an intersection point between the plane for model generation generated in the plane-generating step and a projection line which connects the specified point on the projection plane to a view point for the object in the coordinate system in the three-dimensional space;

determining a position of the graphic in the coordinate system in the three-dimensional space and generating solid model data on the basis of the model coordinate calculated by the coordinate-calculating means and the graphic judged in the judging step; and converting each model coordinate of the solid model data generated in the model data-generating step into a coordinate in a display coordinate system and displaying it on a display unit.

5. A method according to claim 4, further comprising a step of updating the solid model data when the graphic displayed on the display unit is modified.

6. A method according to claim 4, wherein the input device including a mouse and/or a track ball, and a locus of the mouse and/or the track ball is converted to the point sequence data.

* * * * *